Aug. 28, 1951     A. A. BERESTNEFF ET AL     2,565,838
CONTROL ARRANGEMENT FOR ABSORPTION
REFRIGERATION SYSTEMS Filed July 13, 1946     4 Sheets-Sheet 4

INVENTOR.
Alexis A. Berestneff
and William L. McGrath
BY

Patented Aug. 28, 1951

2,565,838

UNITED STATES PATENT OFFICE 2,565,838

CONTROL ARRANGEMENT FOR ABSORPTION REFRIGERATION SYSTEMS

Alexis A. Berestneff and William L. McGrath, Syracuse, N. Y., assignors to Carrier Corporation, Syracuse, N. Y., a corporation of Delaware Application July 13, 1946, Serial No. 683,390

20 Claims. (Cl. 62—5)

1

This invention relates to refrigeration systems and more particularly to an absorption refrigeration system including novel and improved control arrangements for controlling the operation of the system.

In the co-pending application of Alexis A. Berestneff entitled Refrigeration Systems, Serial No. 683,387, filed July 13, 1946, there is disclosed and claimed an absorption refrigeration system to which the control arrangements of the system are particularly adapted. It will be understood, of course, the present invention is not limited to its use in connection with the absorption refrigeration system described in the co-pending application above referred to but may be embodied in any type of system to control the same within desired limits.

The chief object of the present invention is to provide an improved control arrangement.

An object of the invention is to provide an absorption refrigeration system including novel and improved control arrangements for regulating the capacity, the concentration and distribution of solution, the temperature of chilled water, and the quantity of cooling water directed through elements of the system.

A further object is to provide an absorption refrigeration system including means for resetting or adjusting the controls of the system in response to a change in load imposed upon the system.

A still further object is to provide an absorption refrigeration system including means for preventing crystallization of the absorbing medium of the solution.

A still further object is to provide an absorption refrigeration system including safety controls against failure of elements of the system, failure of electrical current supplied to elements of the system, freezing of the solution, freezing of chilled water, flooding of the generator, flooding of the system, and to prevent the absorbing medium breaking the solution. Other objects of our invention will be readily perceived from the following description.

This invention relates to an absorption refrigeration system which comprises in combination an absorber, an evaporator, a generator and a condenser disposed in a closed circuit. Means are provided for withdrawing solution from the generator and for forwarding the solution to the absorber as well as for circulating solution from the absorber to the generator. Refrigerant is forwarded to the evaporator, the refrigerant being flash-cooled in the evaporator; the flashed

2 vapor passes downward to the absorber to be absorbed by the solution therein. In the generator, substantially the same amount of vapor is boiled out, is condensed and passed to the chilled water circuit. A control member is provided in the line connecting the absorber and the generator and serves to throttle the flow of weak solution to the generator. Such control member may be regulated in response to the temperature of chilled refrigerant leaving the evaporator. A control member is provided in the steam line supplying steam to the tubes of the generator and is adapted to control the amount of steam passing through the tubes of the generator. Such control member may be regulated in response to the temperature of strong solution leaving the generator. Reset means are provided for the steam control member and may be used to adjust such member in order to decrease the concentration, for example, of the solution at partial load. The quantity of cooling water passing through the tubes of the absorber and the condenser is governed by a control member disposed in the condensing water line. Such control member may be regulated in response to the temperature of vapor condensate leaving the condenser and being directed to the evaporator.

The attached drawings illustrate a preferred embodiment of our invention in which.

Figure 1:
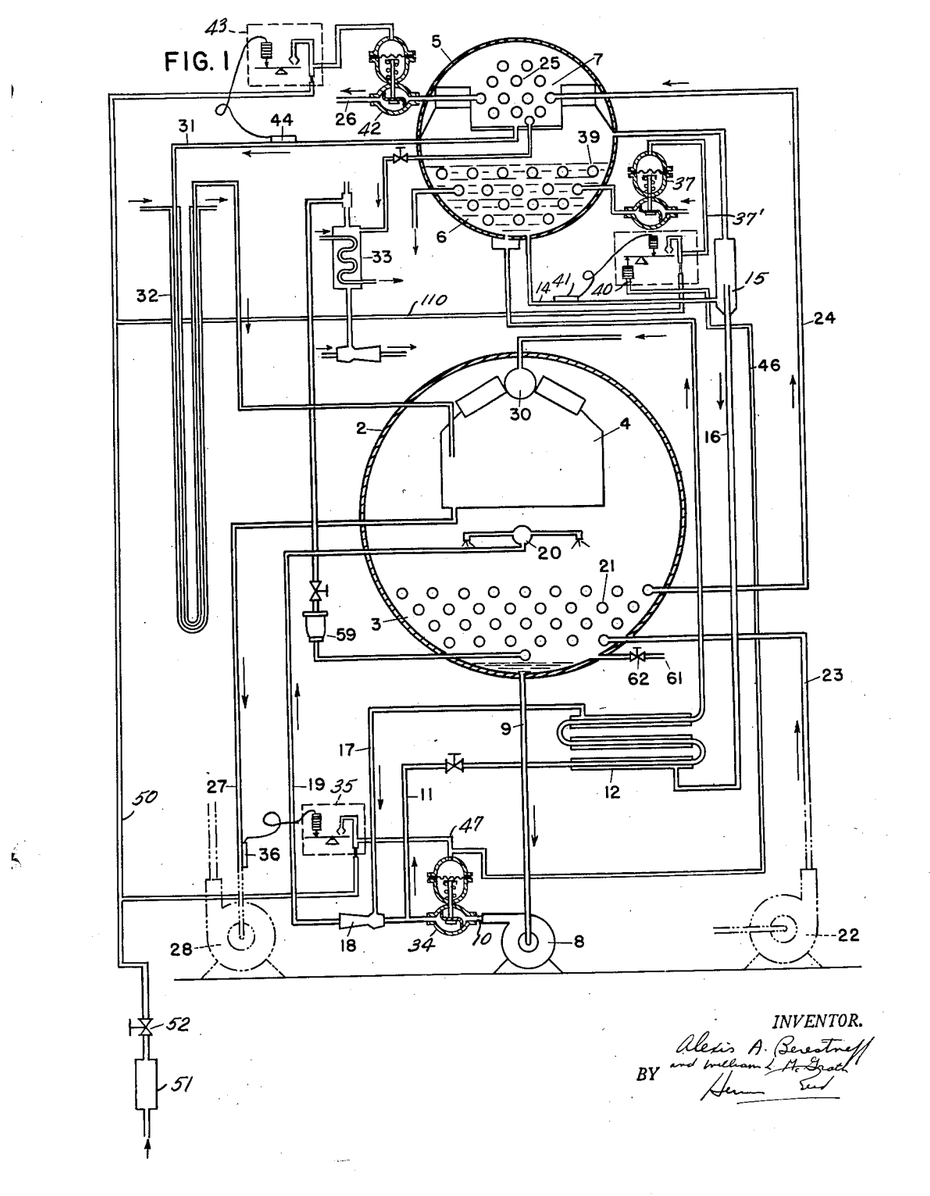
Figure 1 is a diagrammatic view illustrating the flow of solution through the various elements of the refrigeration system.

Referring to the drawings, Figure 1 illustrates diagrammatically an absorption refrigeration system including the improved control arrangements of our invention. The system may include a horizontally extending shell 2 having an absorber 3 disposed in the bottom thereof and an evaporator 4 disposed in the upper portion of the shell. A second shell 5 is supported above shell 2 and includes a generator 6 disposed at the bottom thereof and a condenser 7 disposed in the upper portion of shell 5. Weak solution is withdrawn from absorber 3 by pump 8 through line 9 and is forwarded to the generator 6 through lines 10, 11, heat exchanger 12 and line 13. Strong solution is withdrawn from generator 6 through line 14, overflow arrangement 15, line 16, heat exchanger 12, line 17, ejector 18 which forwards strong solution through line 19 to spray arrangement 20 adapted to spray the solution over the tubes 21 of absorber 3.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Various combinations of refrigerant and absorber may be used in the system described. A solution consisting of lithium bromide and water is highly satisfactory. Other salt solutions may be used if desired in the system. When the system is operated at high temperature (above freezing temperature) a solution of lithium chloride and water or a solution of sodium hydroxide and water, for example, may be used. When the system is used to obtain low temperature, ammonia, for example, may be employed as a refrigerant.

A pump 22 passes cooling or condensing water through line 23 to the tubes 21 of absorber 3. Condensing water after its passage through the tubes of absorber 3 is directed through line 24 to the tubes 25 of condenser 7. This is a preferred arrangement, of course, and it will be understood the water may be passed in the reverse direction or in parallel lines through the tubes 21, 25 of the absorber and condenser. Any suitable means may be provided to supply water for cooling purposes. The condensing water leaves the tubes 25 of condenser 7 through line 26 and may be directed to a cooling tower or to waste as desired.

Chilled water leaves evaporator 4 through line 27 and is circulated through the heat exchange coil of an air conditioning system, for example, by means of pump 28. The refrigerant (chilled water) is returned from the air conditioning system through line 29 and is sprayed by means of spray arrangement 30 in the evaporator 4. The pressure in shell 2 is such that the refrigerant sprayed therein is flash-cooled, the vapor passing downward to be absorbed by the solution in absorber 3 while the cooled refrigerant is collected in evaporator 4 and may be withdrawn therefrom as described above through line 27. A line 31 serves to forward condensate from condenser 7 to evaporator 4. A precooler arrangement 32 is provided in line 31 in order to assure that the condensate forwarded to the evaporator is maintained at a desired temperature.

Any suitable purge arrangement 33 may be provided to withdraw non-condensible gases from the absorber and the condenser.

The absorption refrigeration system described above is disclosed and claimed in the co-pending application of Alexis A. Berestneff above referred to and reference is made to such application for a more complete description thereof.

To attain most satisfactory operation it is desirable that the capacity of the system be changed immediately upon change in load. The temperature of the chilled water may be used to indicate a change in load since a decrease in temperature thereof from a predetermined point indicates that the load upon the system has decreased; it will be understood means other than the temperature of the chilled water may be used to indicate a change in load. If the temperature of the chilled water leaving the evaporator decreases, the capacity of the system may be decreased accordingly by throttling the volume of strong solution passing to the absorber.

Figure 2:
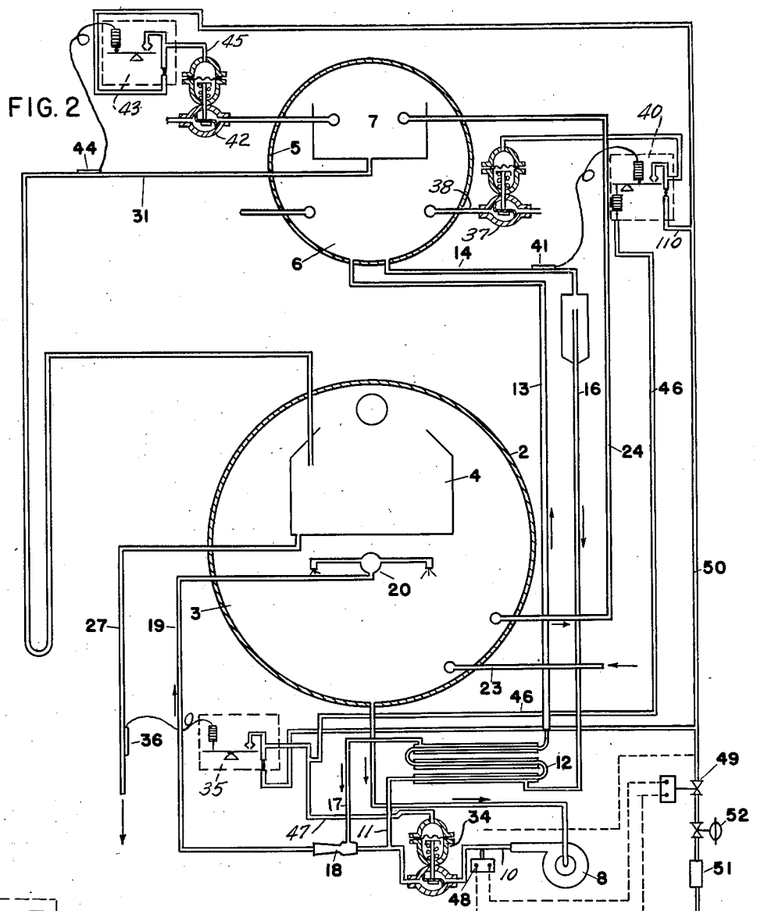
Figure 2 is a diagrammatic view illustrating the position and the operation of the various controls in the system.

Referring to Figures 1 and 2, a conventional air pressure operated valve 34, preferably, is placed in line 10 between pump 8 and ejector 18. It will be understood valve 34 may be disposed at other positions if desired. Valve 34 may be regulated by means of a thermostat control 35 governed by a bulb 36 placed in or adjacent to line 27. As the temperature of chilled water passing through line 27 decreases, fluid in bulb 36 contracts and actuates the thermostat 35 to tend to move valve 34 toward a closed position thereby decreasing the amount of weak solution being forwarded to generator 6 through lines 11 and 13. Movement of valve 34 toward a closed position decreases the amount of weak solution passing to ejector 18, proportionately to the decrease in temperature of chilled water. The reduction in the amount of weak solution passing to ejector 18 reduces the velocity of such solution through the nozzle of such ejector and consequently a smaller quantity of strong solution is entrained or induced. The throttling action of valve 34 accordingly reduces the total amount of solution passing to the absorber 3. The capacity of absorber 3 is controlled by the decreased wetting action provided by the reduction in total solution and by the reduction in strong solution according to the load imposed upon the system.

A standard air pressure operated valve 37 is provided in steam line 38 to regulate the quantity of steam passing into the tubes 39 of generator 6 in accordance with the load imposed upon the system. Valve 37 is connected to thermostat control 40 by line 37' and is actuated by thermostat control 40; control 40 is governed by a bulb 41 disposed in or adjacent to line 14 connecting generator 6 with overflow arrangement 15. As the load decreases and the amount of solution passing from the generator 6 reduces, the temperature of the strong solution in line 14 increases; such increase in temperature indicates that too much steam is being supplied to generator 6, heating the solution and increasing its concentration to an extent not required and in fact to an extent not desirable. Bulb 41 responding to the temperature of solution in line 14 actuates thermostat control 40 to move valve 37 toward a closed position throttling the amount of steam passing through the tubes 39 of generator 6 until it balances with the new load.

The amount of cooling or condensing water passing through the tubes 21 of absorber 3 and the tubes 25 of condenser 7 is controlled by means of a standard air pressure operated valve 42 placed in line 26; valve 42 is actuated by means of a thermostat control 43 governed by a bulb 44 placed in or adjacent to condensate line 31. Valve 42, if desired, may be disposed in position in lines 23 or 24; in Figure 2, it is illustrated as disposed in line 24. If cooling water is passed in parallel lines through tubes 21 of absorber 3 and tubes 25 of condenser 7, a similar valve may be provided in the line supplying condensing water to the tubes of the absorber or to the line through which the water is withdrawn.

The concentration of the strong solution leaving generator 6 depends upon the temperature and pressure of solution in shell 5. Pressure in shell 5 may be maintained by means of condenser 7. The pressure in shell 5 is dependent upon the condensing temperature of condenser 7. As the temperature of the vapor condensate in line 31 decreases, it serves as an indication that too large an amount of condensing water is being permitted to flow through the tubes of condenser 7. Bulb 44 regulates thermostat control 43 to throttle valve 42 decreasing the amount of condensing water flowing through the tubes of absorber 3 and condenser 7. The condensing temperature may be controlled by regulating the temperature of the cooling water within desired limits.

By means of valves 37 and 42 temperature and pressure of the solution in shell 5 is controlled and thereby indirectly provides control of concentration of solution.

Figure 6:
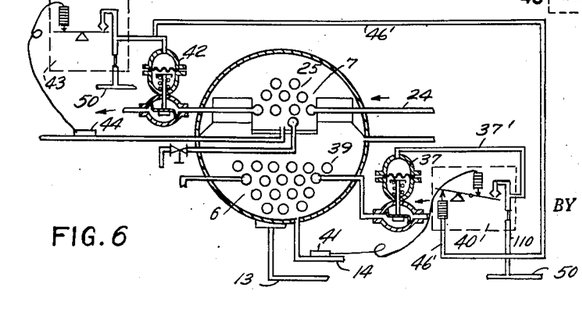
Figure 6 is a fragmentary diagrammatic view illustrating an alternative reset control arrangement.

While generally it is desirable to maintain the concentration of the solution constant in accordance with temperature and pressure conditions in shell 5 in some cases it may be desirable to decrease the concentration of the solution at partial load (refer to the description of control 40). For this purpose reset means are provided to change the control point of thermostat 40. Thermostat 40 is provided with such means. The reset control means is not limited in its use to effect a decrease in concentration of the solution at partial load since it may be employed, if desired to maintain the concentration of the solution at any desired point or within any desired range. The means illustrated in Figures 1 and 2, if desired, may be replaced with other control members to govern the concentration of the solution, for example, in Figure 6, thermostat 40 is connected to line 45 by line 46' instead of connected to line 47 by line 46. The control point or range of thermostat 40 may be varied by air pressure through line 46 connected to air line 47 which operates valve 34. The reset means so provided serves to change the control point of thermostat 40. As air pressure in line 47 decreases it resets the control point of thermostat 40 responsive to the desired temperature of the solution leaving the generator and pressure in shell 5 thereby indirectly decreasing the concentration of the solution to the desired degree. In place of air line 46 air line 46' (shown in Figure 6) may be provided connected to air line 45 which operates valve 42 to obtain the desired reset control.

It is desirable to shut down the machine if solution pump 8 fails, for example, to prevent damage to the remaining elements of the system. As shown in Figure 2, a pressure switch 48 is provided responsive to the pressure created by pump 8. When pump 8 is started, the pressure on the pump discharge operates the pressure switch which in turn causes automatic air shut-off valve 49 in the main air line 50 to open permitting air to be supplied to the various elements of the control system as indicated. If, during operation, pump 8 fails to operate for any reason, loss of discharge pressure actuates pressure switch 48 which in turn causes the automatic air shut-off valve 49 to close. Closing of valve 49 discontinues the supply of air to the various controls allowing them to return to normal position to close valves 34, 37 and 42, preventing passage of solution through the system, passage of steam through the tubes of the generator and passage of condensing water through the tubes of the absorber and the condenser. As shown in Figure 2, filter 51 and pressure regulator 52 may be provided in main air line 50. Such elements are well known and need not be described in detail.

As illustrated in Figure 2, the various thermostat controls 35, 40, 43, are connected to main air line 50 and are operable in response to a predetermined air pressure therein. The various bulb controls 36, 41 and 44 serve to govern the operation of such thermostats to regulate the operation of valves 34, 37 and 42 in response to the various conditions which arise during operation of the system. In addition, of course, various functional and safety controls may be provided, as hereinafter discussed, to attain most efficient and effective operation of the system.

Figure 3:
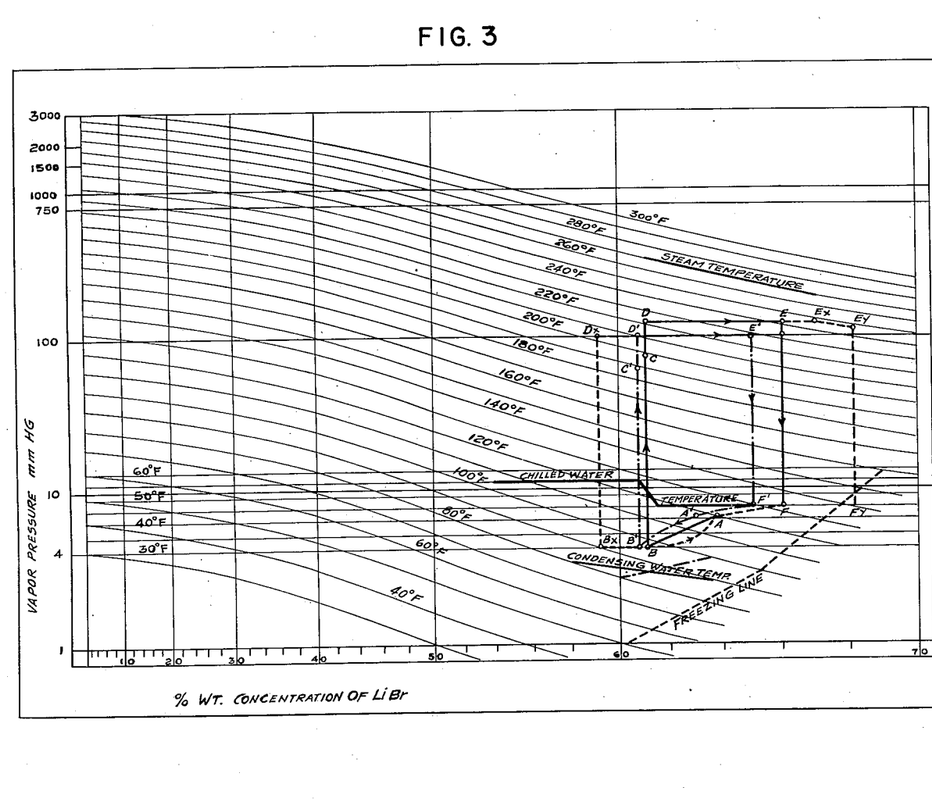
Figure 3 is a diagram illustrating the operation of the refrigeration system and the manner in which the cycle may be adjusted to permit operation at partial load.

The refrigeration cycle of the absorption system and the manner in which it is affected by the various control arrangements is illustrated diagrammatically in Figure 3. Figure 3 illustrates the refrigeration cycle at full load as well as the temperatures of chilled water supplied to and leaving the evaporator, steam supplied to the generator, and cooling water entering the absorber and leaving the condenser.

Referring to Figure 3, it will be noted that the ordinates indicate the concentrations of the solution in weight percent of lithium bromide, the preferred absorbent. The abscissae indicate the vapor pressure of water in the solution in millimeters. The arcuate lines are the lines of constant temperatures of the solution which correspond to the pressure and concentration at any point of the chart at saturated conditions. Any point of the chart being projected horizontally from the zero concentration line indicates the temperature of the water in equilibrium with the solution at this point.

Under conditions of full load for which the system is designed, it will be noted that the temperature of steam supplied to the generator is about 270°, the temperature of condensing water entering the absorber is 80° F., while the temperature of condensing water leaving the condenser has been raised to 90° F. In other words, the temperature of the condensing water has been raised by its passage through the absorber and the condenser. The temperature of chilled water entering the evaporator as indicated is about 55° F., such water being flash cooled as indicated to a temperature of about 45° F. (temperature of chilled water leaving the evaporator). The freezing line serves to indicate generally the temperature and concentration at which the absorbent begins to crystallize and to precipitate from solution.

The refrigeration cycle is shown by solid lines. Point A is deemed the beginning of the cycle for purposes of illustration, and indicates the point at which the mixture of weak solution and strong solution is formed in the ejector. Solid line A—B indicates the passage of solution from the ejector 18 through the absorber 3 to the heat exchanger 12. The dotted line B—A serves to show weak solution at a lower temperature returning to point A and mixing with the strong solution at such point. At point B (where the weak solution enters the heat exchanger) it will be noted the temperature of the solution is about 95° F. and that the pressure has been decreased.

Ordinate B—C illustrates the passage of weak solution through the heat exchanger. Temperature of the weak solution is increased by its passage through the heat exchanger. The continuation C—D of ordinate B—C serves to illustrate the increase in temperature during the preheating period in the generator (the temperature increase required to bring the solution to its boiling point in the generator). Abscissa DE illustrates evaporation of solution in the generator at a constant pressure with an increase in temperature and concentration of solution. Ordinate EF illustrates the passage of strong solution through the heat exchanger, showing the decrease in temperature and pressure caused by its heat exchange relationship with weak solution (indicated by ordinate BC). Line FA is dotted to indicate the passage of strong solution from the heat exchanger to the ejector (point A) where it is mixed with weak solution from the absorber as indicated by dotted line BA.

As described above, this diagram illustrates the refrigeration cycle under design conditions (operation at full load). If, for example, the load imposed upon the system decreases, the temperatures of condensing water and steam remaining constant, then the cycle illustrated by the solid lines will change in a manner corresponding to the change in load. Such a decrease in load is indicated by the dotted lines at the right side of the diagram.

Assume that the load imposed upon the system has decreased. Bulb 36 reflecting such change in load actuates thermostat control 35 to move valve 34 toward a closed position throttling the flow of weak solution to the generator and likewise decreasing the flow of the mixed solution to the absorber. Since the steam flow through the generator is sufficient to maintain a desired temperature of leaving strong solution at full load, the temperature and concentration of leaving solution will increase. Such increase in temperature is reflected by bulb 41 which actuates thermostat control 40 to tend to move valve 37 toward a closed position decreasing the quantity of steam supplied to the generator and thus decreasing the pressure maintained in shell 5 with a consequent further increase in concentration of solution leaving the generator. Such changes in temperature and pressure have been illustrated by dotted lines E—E$x$ and E$x$—E$y$. Actually the lines connecting points E and E$y$ might well be shown as a single line since the effects illustrated by such lines actually are the resultant of the two different forces. We have illustrated the line in two components to set forth more clearly that a number of factors are affected by the decrease in load imposed upon the system.

The ordinate E$y$—F$y$ illustrates the passage of strong solution at partial load through the heat exchanger. It will be noted that such line not only may come dangerously close to the freezing line but actually cross it. Thus a highly dangerous and unsatisfactory operating condition is created by the attempted operation at partial load. It is essential that such line indicating the passage of strong solution through the heat exchanger be moved to the left rather than to the right of the diagram in order to move point F (or its corresponding points) away from the freezing line.

The reset control may be used for this purpose. Upon a decrease in load, bulb 36 actuates thermostats 35 decreasing the air pressure in line 47 to tend to move valve 34 toward a closed position. The decrease in air pressure in line 47 is reflected through line 46 upon thermostat 40. The decrease in air pressure adjusts the control point of thermostat 40 to lower the solution temperature to which it is responsive. This decrease in solution temperature would be reflected on the diagram by moving the line indicating the passage of strong solution through the heat exchanger toward the left to move it away from the freezing line. The reset control resets or adjusts thermostat 40 to actuate valve 37 at temperatures under partial loads different from the temperature to which it is responsive under full load.

The reset control may be used to adjust thermostat 40 to compensate for the increase in temperature of solution leaving the generator, the decrease in pressure in shell 5, both of which factors would serve to increase the concentration of solution leaving the generator, and in addition, a desired amount to provide a further safety or over-safety factor to assure safe operation under conditions of partial load. Such adjustment or resetting changes the temperatures to which thermostat 40 responds. It will be understood by reference to the diagram shown in Figure 3 that a change in temperature will compensate for the change in pressure at partial load. Accordingly, under partial load after resetting of control 40 point E of the cycle is adjusted to point E' which indicates different pressure and temperature of solution leaving the generator.

If the cooling water temperatures are maintained constant and the same quantity of cooling water is passed through the tubes of the absorber under such conditions, the cycle range is broadened to a degree not necessary since the cooling capacity is increased at a time it should be decreased. In addition, broadening of the cycle range is undesirable since it may cause abrupt and irregular variation of the controls. Such condition is indicated by the dotted lines at the left of the diagram shown in Figure 3 connecting points B', B$x$, D$x$ and D'.

Under the conditions described above, the temperature of the vapor condensate leaving the condenser will decrease; the decrease in temperature of condensate, reflected by bulb 44, will cause thermostat 43 to be actuated to move valve 42 toward a closed position throttling the flow of condensing water through the tubes of the absorber and the condenser. The change in the temperature is illustrated by the dot-and-dash line; it will be noted that the temperature of condensing water entering the absorber remains at 80° F. while the temperature of condensing water leaving the condenser has increased to 100° F.

The decrease in the amount of condensing water supplied to the absorber and the condenser accordingly moves points B$x$ and D$x$ toward the right to points B' and D', in effect, "squeezing" the range for more efficient and satisfactory operation at partial load.

The refrigeration cycle at partial load is illustrated by the dot-and-dash lines connecting points A', B', C', D', E' and F'. Such points corresponding generally to points A, B, C, D, E and F illustrating operation of the system at full load; it will be noted that the cycles illustrated are similar in contour but that the cycle illustrating operation of the system at partial load is still farther from the freezing line (the dangerous condition).

The various controls which automatically operate to effect these changes in the refrigeration cycle provide immediate and accurate control of the operation of the system from full load, for example, 150 tons of refrigeration, to partial loads as small as 10 tons. The controls permit smooth economical operation at any partial load within the range described above. While the diagram shown in Figure 3 illustrates the refrigeration cycle at one partial load, it will be understood the controls function automatically to adjust or to correct the cycle to any condition of partial load within the range described above.

Overflow arrangement 15 aids in controlling solution distribution in the system since it assures that a minimum quantity of solution is maintained in the generator at all times. The performance of ejector 18 is governed to some extent by the column of strong solution maintained in line 16 and by the pressure maintained in shell 5.

As described above, pressure in shell 5 may be regulated by throttling the flow of condensing water through the condenser 7. Concentration of solution in the generator 6 is maintained at approximately a desired point by the automatic control of temperature and pressure maintained in shell 5; concentration of solution in the absorber 3 may be varied or influenced by throttling the flow of cooling water through the tubes of the absorber. Resetting of the steam control decreases the temperature of solution leaving the generator and in combination with the control of cooling water to the machine governs indirectly the flow of solution. Narrowing concentration range of the solution at partial loads, as described above, prevents the decrease in temperature of chilled water from moving valve 34 too far toward a closed position.

Figure 4:
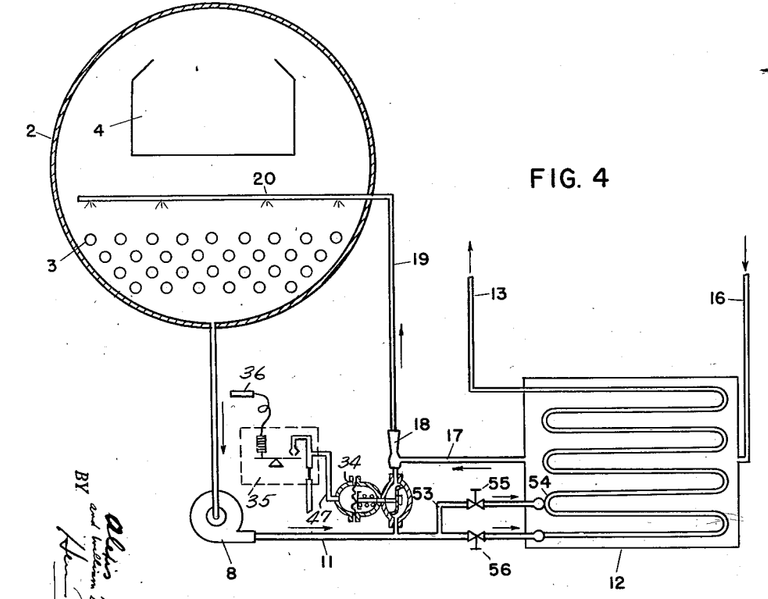
Figure 4 is a diagrammatic view illustrating a control arrangement permitting operation at higher concentration of solution during partial loads.

In order to permit satisfactory operation of the system at high concentrations of solution in the generator, a portion of the heat exchanger 12 may be bypassed. In Figure 4 there is illustrated diagrammatically suitable means for effecting partial bypass of the heat exchanger. Such means are disclosed and claimed in the co-pending application of Alexis A. Berestneff, Serial No. 683,388, filed July 13, 1946, now United States Patent No. 2,461,513, dated February 15, 1949. Referring to Figure 4, a line 53 is provided connecting line 11 with a desired loop 54 of the heat exchanger 12. A manually operable valve 55 is disposed in line 53. A similar valve 56 may be disposed in line 11 as shown. When it is desired to bypass or to cut out some portion of the heat exchanger surface, valve 55 may be opened and valve 56 throttled or closed thus permitting weak solution to flow through line 53 to the heat exchanger without passing through the complete exchanger surface. Solution then leaving the heat exchanger is at a higher temperature which will permit operation at a higher concentration of solution leaving the generator without danger of approaching the freezing line.

Figure 5:
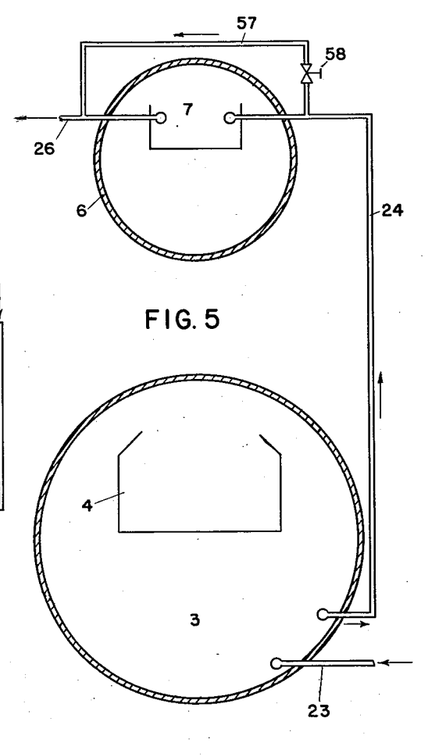
Figure 5 is a diagrammatic view illustrating a modified control arrangement.

As illustrated diagrammatically in Figure 5, a line 57 around the condenser 7 may be provided to permit a portion of the cooling water passing through line 24 from the absorber 3 to bypass condenser 7. A valve 58 may be disposed in bypass 57 to regulate the quantity of cooling water passing through condenser 7 and bypass 57. The flow of cooling water through the condenser and the absorber may be varied as desired to obtain desired performance of the condenser and the absorber.

Purge arrangement 33 is illustrated in Figure 1 and serves to remove non-condensible gases from the absorber and condenser. Upon an overnight shutdown the level of solution in absorber rises; upon start-up in the morning, for example, purge 33 may remove liquid from the absorber which is undesirable. To avoid this danger, a ball valve 59 of well known construction may be provided in the line connecting purge arrangement 30 with absorber 3 as shown in Figure 1. An increase in level of liquid in the absorber raises the ball (not shown) of valve 59 to close the line to the purge thus preventing liquid from being sucked up by the purge when the system is again operated.

Under some conditions additional water may be introduced to the system during an overnight shut down to dilute the solution. A suitable line 61 is illustrated in Figure 1 for this purpose. A valve 62 is disposed in line 61 to control flow of water therethrough. Assuming it is intended to shut down the system overnight, for example, steam may be cut off while the evaporator continues to operate. A certain amount of water is absorbed by the solution but in some cases an insufficient quantity may be absorbed. Valve 62 may be opened to add a desired quantity of water to the solution in the absorber to dilute the same.

The control arrangements of the present invention permit operation of the absorption refrigeration system from full load to very minor partial loads. Under such varying conditions of operation the control arrangements provided by the present invention function adequately and smoothly to change the operation of the system automatically in accordance with the load imposed upon the system. The control arrangements serve to regulate the capacity of the system, the concentration of solution, the temperature of chilled water leaving the system, flow of condensing water through the tubes of the absorber and the condenser, steam flow through the tubes of the generator and provide various safety controls effective to increase the economical and efficient operation of the system.

While we have described and illustrated a preferred embodiment of our invention, it will be understood our invention is not limited thereto since it may be otherwise embodied within the scope of the following claims.

We claim:

1. In an absorption refrigeration system, the combination of an absorber, an evaporator, a generator, a condenser, a pump for withdrawing weak solution from the absorber and for supplying the weak solution to the generator, means disposed in a line connecting the generator and the absorber adapted to receive a stream of weak solution from the pump thereby entraining strong solution and supplying the mixture to the absorber, and second means for controlling the capacity of the absorber, said means including a valve for throttling solution flow, and thermal responsive means responsive to temperature of refrigerant leaving the evaporator for controlling the operation of said valve, throttling of said valve decreasing the amount of weak solution supplied to the generator and proportionately decreasing the amount of strong solution supplied to the absorber by the first means.

2. In an absorption refrigeration system, the combination of an absorber, an evaporator, a generator and a condenser, means for circulating solution from the absorber to the generator and from the generator to the absorber, means for controlling the capacity of the system, said means including a control member placed in a solution line to regulate the quantity of solution circulating through the system, means for controlling the operation of said member in response to variation in temperature of refrigerant leaving the evaporator, a second control member adapted to regulate the quantity of heating medium passing to the generator, and means responsive to variation in temperature of strong solution leaving the generator for controlling the operation of said second means.

3. In an absorption refrigeration system, the combination of an absorber, an evaporator, a generator and a condenser, means for circulating solution from the absorber to the generator and from the generator to the absorber, means for controlling the capacity of the system, said means including a control member placed in a solution line to regulate the quantity of solution circulating through the system, means for controlling the operation of said member in response to variation in load imposed upon the system, a second control member disposed to regulate the quantity of cooling fluid supplied to the condenser, and means responsive to the temperature of vapor condensate leaving the condenser for governing the operation of said second control member.

4. In an absorption refrigeration system, the combination of a horizontally disposed shell, a member disposed in said shell cooperating therewith to form an absorber, a second member disposed in said shell cooperating therewith to form an evaporator, a second shell disposed adjacent the first shell, a member in said second shell cooperating therewith to form a generator, a second member in said second shell cooperating therewith to form a condenser, a pump adapted to circulate weak solution from the absorber to the generator, a line connecting the generator and the absorber, an ejector disposed in said line, said pump serving to discharge a portion of weak solution in said ejector thereby entraining solution from the generator and supplying it to the absorber, a solution overflow arrangement disposed in the line connecting the generator and the absorber, a second line connecting the condenser and the evaporator to forward condensate to the evaporator, means for purging the condenser and the absorber of non-condensible gases, means for controlling the quantity of steam passing through the generator and the quantity of cooling water passing through the condenser, and thermal responsive members for actuating said means, one of said members being operable in response to variation in temperature of strong solution leaving the generator, and a second thermal responsive member being operable in response to variation in temperature of vapor condensate leaving the condenser.

5. In an absorption refrigeration system, the combination of a horizontally disposed shell, a member in said shell cooperating therewith to form an absorber, a second member in said shell cooperating therewith to form an evaporator serving to flash-cool refrigerant, the flashed vapor passing downward to the absorber to be absorbed by solution therein, a second horizontally disposed shell disposed above said first shell, a member in said second shell cooperating therewith to form a generator, a second member in said second shell disposed above the first member and cooperating with the second shell to form a condenser, the generator serving to vaporize refrigerant which passes upward and is condensed in the condenser, a pump for circulating weak solution from the absorber to the generator, an ejector adapted to withdraw strong solution from the generator and to supply it to the absorber, a line connecting the ejector and the pump, said pump serving to discharge a stream of weak solution into the ejector thereby entraining strong solution from the generator and supplying the mixture of solutions to the absorber, a valve disposed in the line connecting the ejector and the pump, said valve being disposed between the pump and the juncture of a line connecting said first line with the generator, thermal responsive means controlling the operation of said valve, throttling of said valve serving to supply a decreased quantity of weak solution to the generator and to discharge a decreased quantity of weak solution in the ejector thereby entraining a reduced quantity of strong solution from the generator and decreasing the quantity of solution supplied to the absorber, said thermal responsive means being disposed adjacent the evaporator chilled water line, a line adapted to supply heating medium to the tubes of the generator, a second valve in said supply line, and thermal responsive means adapted to govern said second valve in response to the temperature of solution leaving the generator, actuation of said valves serving to change the capacity of the system in accordance with the load imposed thereon.

6. In an absorption refrigeration system, the combination of an absorber, an evaporator, a generator and a condenser, means for circulating solution from the absorber to the generator and from the generator to the absorber, means for controlling the capacity of the system, said means including a control member disposed to regulate the quantity of solution circulating through the system, means for controlling the operation of said member in response to variation in temperature of refrigerant leaving the evaporator, a second control member adapted to regulate the quantity of heating fluid passing to the generator, means responsive to variation in temperature of solution leaving the generator for controlling the operation of said second member, and means for adjusting said second member controlling means in response to change in load imposed upon the system.

7. In an absorption refrigeration system including an absorber, an evaporator, a generator and a condenser disposed in a closed circuit, means for passing cooling fluid to the coil of the condenser, means for circulating heating medium through the coil of the generator, a strong solution line connecting the generator and the absorber, a valve in the condenser line serving to throttle the amount of cooling fluid passing through the tubes of the condenser, thermal responsive means adapted to control said valve in accordance with the temperature of condensate, a second valve disposed in the line supplying heating medium to the tubes of the generator, thermal responsive means adapted to actuate said second valve in response to the temperature of solution leaving the generator, a third valve adapted to throttle the amount of weak solution passing to the generator and the amount of strong solution passing to the absorber, and thermal responsive means adapted to actuate said third valve in response to the temperature of chilled water leaving the evaporator, said second valve and said third valve serving to control the capacity of the system.

8. In an absorption refrigeration system including an absorber, an evaporator, a generator and a condenser forming a closed circuit, means for supplying cooling fluid to the tubes of the condenser and the absorber, control means for regulating the quantity of cooling fluid supplied to the tubes of the condenser and the absorber, thermal responsive means for governing said control means, means for passing heating medium through the tubes of the generator, second control means for regulating the quantity of heating medium supplied to the tubes of the generator, second thermal responsive means for governing said second control means, third control means disposed in a solution line for regulating the quantity of solution passing to the absorber, and third thermal responsive means adapted to govern said third control means.

9. In an absorption refrigeration system including an absorber, an evaporator, a generator and a condenser forming a closed circuit, means for passing cooling fluid to the tubes of the absorber and the condenser, means for circulating heating medium through the tubes of the generator, a vapor condensate line connecting the condenser and the evaporator, a strong solution line connecting the generator and the absorber, a valve serving to throttle the amount of cooling fluid passing through the tubes of the absorber and the condenser, thermal responsive means adapted to control the operation of said valve, a second valve adapted to regulate the quantity of heating medium passing to the tubes of the generator, thermal responsive means responsive to the temperature of the strong solution adapted to control the operation of said second valve, and means for automatically adjusting said heating medium control means upon change in load imposed upon the system.

10. In an absorption refrigeration system, the combination of an absorber, an evaporator, a condenser and a generator, means connecting the absorber and the generator to supply solution from the absorber to the generator, means connecting the generator and the absorber to supply solution from the generator to the absorber, a pump for supplying solution from the absorber to the generator, air-governed control arrangements for regulating the operation of the system, and means responsive to pressure created by said pump for discontinuing air supply to the control arrangements whereby failure of said pump automatically actuates said controls to discontinue operation of the system.

11. An absorption refrigeration system according to claim 10 in which said pressure responsive means comprises a pressure switch disposed adjacent the pump discharge, said switch being connected to a shut-off valve disposed in the main air line leading to the control arrangements whereby pressure created by said pump actuates said switch to open the valve to supply air to the control arrangements, failure of said pump actuating said switch to close the valve discontinuing supply of air to the control arrangements, and discontinuing operation of the system.

12. In a control arrangement, the combination of a member governing the flow of a solution through heat exchange apparatus, said member being placed in a feed line to said apparatus, means for regulating the operation of said member, means for supplying steam to the heat exchange apparatus, a valve adapted to regulate the quantity of steam passing through the heat exchange apparatus, means responsive to the temperature of solution leaving the heat exchange apparatus for controlling the operation of said valve, and means adapted to automatically reset said control means upon change in load imposed upon the system.

13. In an absorption refrigeration system, the combination of an evaporator, an absorber, a condenser and a generator, means connecting the absorber and the generator to supply weak solution from the absorber to the generator, means connecting the generator and the absorber to supply strong solution from the generator to the absorber, means for supplying a heating medium to the generator, a valve for regulating the supply of heating medium to the generator, a thermostat responsive to the variation in temperature of strong solution leaving the generator for actuating said valve and a control to automatically reset said thermostat when the system is operated at partial load to prevent crystal formation in the solution.

14. In an absorption refrigeration system, the combination of an absorber, an evaporator, a generator, a condenser, a pump for withdrawing weak solution from the absorber and for supplying the weak solution to the generator, means disposed in the line connecting the generator and the absorber adapted to receive a stream of weak solution from the pump thereby entraining strong solution and supplying the mixture to the absorber, and second means for controlling the capacity of the absorber, said second means including a valve for throttling the solution flow and means reflecting change in load imposed upon the system for controlling the operation of said valve, throttling of said valve decreasing the amount of weak solution supplied to the generator and proportionately decreasing the amount of strong solution supplied to the absorber by the first means.

15. In an absorption refrigeration system, the combination of an absorber, an evaporator, a generator, a condenser, a pump for withdrawing weak solution from the absorber and for supplying the weak solution to the generator, means disposed in a line connecting the generator and the absorber adapted to receive a stream of weak solution from the pump thereby entraining strong solution and supplying the mixture to the absorber, means for controlling the capacity of the absorber, said means including a valve for throttling solution flow and means reflecting a change in load imposed upon the system for controlling the operation of said valve, throttling of said valve decreasing the amount of weak solution supplied to the generator and proportionately decreasing the amount of strong solution supplied to the absorber by the first means, means for supplying heating medium to the generator, a control member adapted to regulate the quantity of heating medium supplied to the generator, and means for controlling the operation of said control member.

16. In an absorption refrigeration system, the combination of an absorber, an evaporator, a generator and a condenser, means for circulating solution from the absorber to the generator and from the generator to the absorber, means for supplying heating medium to the generator, a control member adapted to regulate the quantity of heating medium supplied to the generator, means for regulating the operation of said member and means for adjusting the control point of said third means responsive to a change in temperature of refrigerant leaving the evaporator.

17. In an absorption refrigeration system including an absorber, an evaporator, a generator and a condenser forming a closed circuit, means for supplying cooling fluid to the tubes of the condenser and the absorber, control means for regulating the quantity of cooling fluid supplied to the tubes of the condenser and the absorber, means for governing said control means, means for passing heating medium through the tubes of the generator, second control means for regulating the quantity of heating medium supplied to the tubes of the generator, means for governing said second control means, third control means for regulating the quantity of solution passing to the absorber, and means adapted to govern said third control means.

18. In an absorption refrigeration system the combination of an absorber, an evaporator, a generator, and a condenser, means for circulating solution from the absorber to the generator and from the generator to the absorber, means for supplying cooling fluid to the condenser and to the absorber, said means being placed in a cooling fluid line, means adapted to regulate the quantity of cooling fluid passing through the tubes of the absorber and the condenser, and means responsive to the temperature of vapor condensate leaving the condenser for controlling the operation of said regulating means.

19. In an absorption refrigeration system the combination of an absorber, an evaporator, a generator and a condenser, means for circulating solution from the absorber to the generator and from the generator to the absorber, a control member adapted to regulate the quantity of solution circulating through the system, means for controlling the operation of said member in response to load imposed upon the system, a second control member disposed to regulate the quantity of heating medium supplied to the generator, means for controlling the operation of said second member in response to variation in temperature of solution leaving the generator, a third control member disposed to regulate the quantity of cooling fluid supplied to the tubes of the condenser, and means for controlling the operation of said third member.

20. In an absorption refrigeration system the combination of an absorber, an evaporator, a generator and a condenser, means for circulating solution from the absorber to the generator and from the generator to the absorber, means for controlling the capacity of the system, said means including a control member disposed to regulate the quantity of solution circulating through the system, means for controlling the operation of said member in response to variation in load imposed upon the system; a second control member adapted to regulate the quantity of heating fluid passing to the generator, means responsive to variation in temperature of solution leaving the generator for controlling the operation of said second member and means for resetting the second member controlling means in response to change in load imposed upon the system.

ALEXIS A. BERESTNEFF.
WILLIAM L. McGRATH.

REFERENCES CITED

The following references are of record in the file of this patent:

UNITED STATES PATENTS

| Number | Name | Date |
|---|---|---|
| 1,109,021 | Southworth et al. | Sept. 1, 1914 |
| 2,044,597 | Thomas | June 16, 1936 |
| 2,061,606 | Zellhoefer | Nov. 24, 1936 |
| 2,275,997 | Shannon | Mar. 10, 1942 |
| 2,319,601 | Hedlund | May 18, 1943 |
| 2,356,638 | Williams | Aug. 22, 1944 |
| 2,381,427 | Andersson | Aug. 7, 1945 |
| 2,430,047 | Edberg | Nov. 4, 1947 |